(No Model.)
L. EASLEY.
CORN PLANTER.
No. 325,400. Patented Sept. 1, 1885.
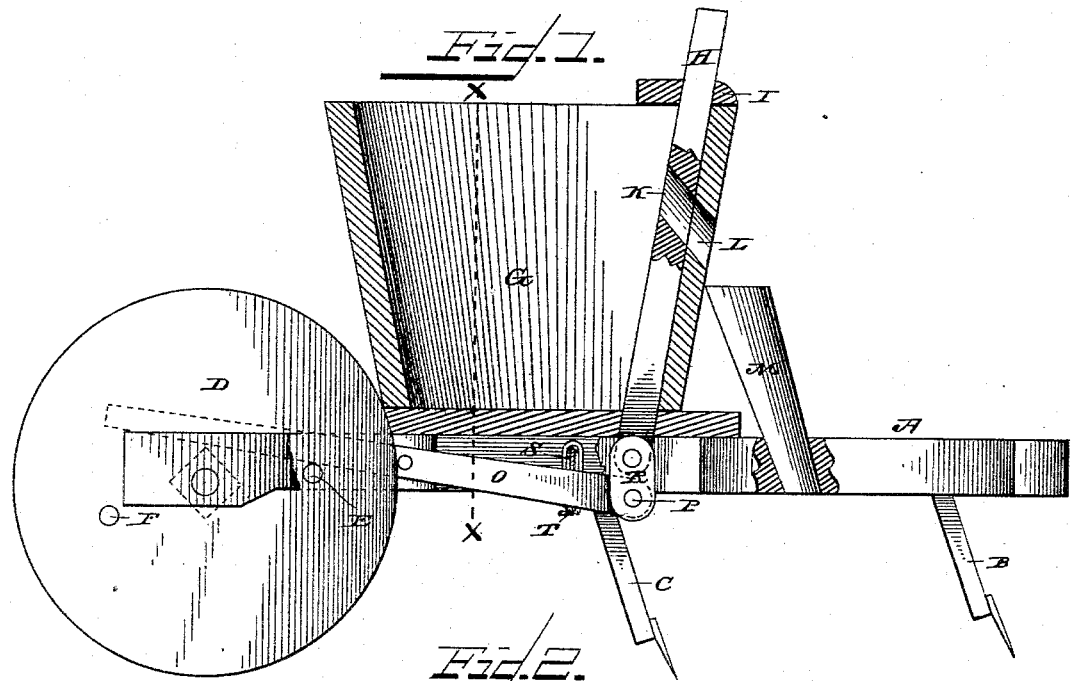
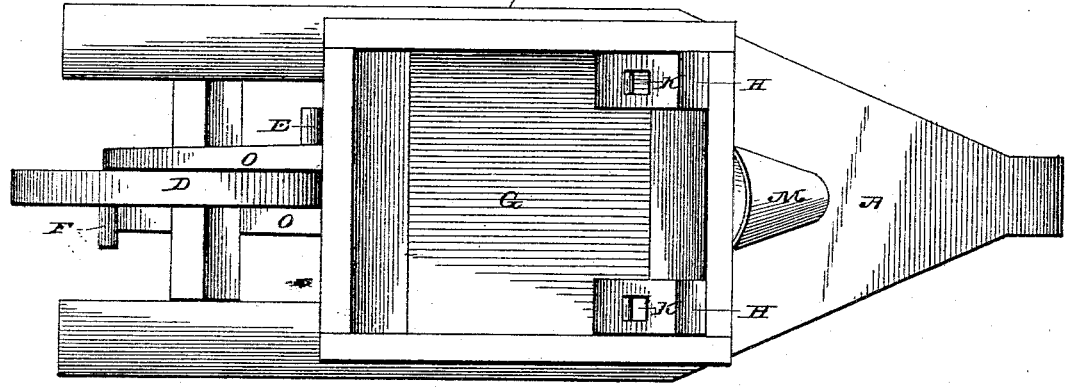
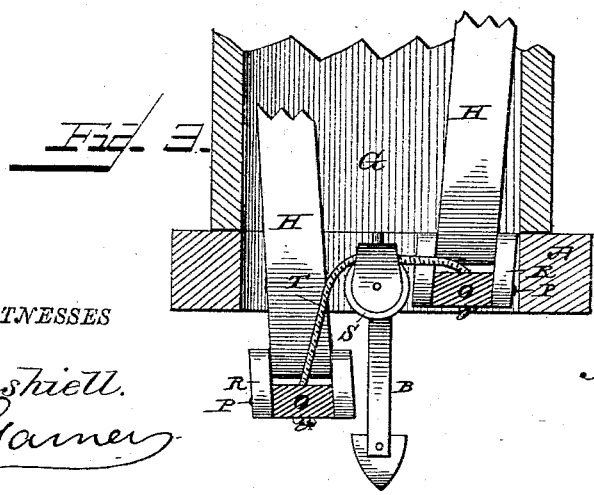
WITNESSES
C. W. Dashiell.
J. W. Garner
INVENTOR
Levi Easley.
By C. A. Snow &Co.
Attorneys

UNITED STATES PATENT OFFICE.

LEVI EASLEY, OF WHITT, TEXAS.

CORN-PLANTER.

SPECIFICATION forming part of Letters Patent No. 325,400, dated September 1, 1885.

Application filed May 26, 1885. (No model.)

*To all whom it may concern:*

Be it known that I, LEVI EASLEY, a citizen of the United States, residing at Whitt, in the county of Parker and State of Texas, have invented a new and useful Improvement in Check-Row Corn-Planters, of which the following is a specification, reference being had to the accompanying drawings.

My invention relates to an improvement in check-row corn-planters; and it consists in the peculiar construction and combination of devices, that will be more fully set forth hereinafter, and particularly pointed out in the claim.

In the accompanying drawings, Figure 1 is a side elevation, partly in section, of a planter embodying my invention. Fig. 2 is a top plan view of the same. Fig. 3 is a vertical transverse section on the line $x$ $x$, Fig. 1.

A represents a frame or platform having a furrow-opener, B, depending from its front end, coverers C depending from its sides, and a wheel, D, having its shaft journaled in between the rear bifurcated ends of the platform or frame.

From one side of the wheel projects a tappet-pin, E, and from the opposite side of the wheel, in a line with the pin E, and diametrically opposite the center of the wheel, projects a tappet-pin, F.

G represents a hopper, which is secured on the frame or platform, and has inclined sides and a closed bottom.

H represents seed-slides that slide on the inner side of the front side of the hopper, their lower ends extending through openings in the bottom of the hopper, and their upper ends being guided by ways or guides I. These seed-slides have openings K that form seed-cups, and in the front side of the hopper, at a suitable distance above the bottom thereof, are made openings L.

A seed-spout, M, passes through the frame or platform, immediately in front of the hopper, and the upper end of this seed-spout is widened sufficient to catch the seeds that are dropped from either of the openings L and discharge them into the furrow.

Levers O are fulcrumed at the points P below the hopper, and have their front ends connected by pivoted links R to the lower ends of the seed-slides. The rear ends of these fulcrumed levers engage with the tappet-pins E F.

A sheave, S, is secured beneath the hopper, and over this sheave passes a cord or strap, T, the ends of which are secured to the front ends of the levers.

As the planter is drawn along its tappet-pins work the levers O, which causes the slides H to move up and down alternately and discharge the seeds that they gather in their seed-cups through the openings L, and through the spout into the furrow.

By making the openings or cups in the seed-slides large or small the quantity of seeds planted in each hill can be regulated, and by reason of the construction and operation hereinbefore described the hills will be planted at equal distances apart, as will be very readily understood, and thereby adapt the machine for use as a check-row planter.

Having thus described my invention, I claim—

The combination of the frame and the hopper having the closed bottom and the openings L in one side, with the driving-wheel, having the tappet-pins E F, the seed-slides having the openings or cups K, the fulcrumed levers O, actuated by the tappet-pins, and connected to the lower ends of the seed-slides, and the cord or strap T, passing over the sheave S, and secured to the free ends of the levers, whereby the seed-slides are reciprocated alternately in opposite directions, substantially as described.

In testimony that I claim the foregoing as my own I have hereto affixed my signature in presence of two witnesses.

LEVI EASLEY.

Witnesses:
J. C. HAYNES,
J. W. HAYNES.